US006431346B1

United States Patent
Gilmore et al.

(10) Patent No.: US 6,431,346 B1
(45) Date of Patent: Aug. 13, 2002

(54) EXTENDABLE TRAILER LOADER/UNLOADER WITH USER INTERFACE SECTION

(75) Inventors: Phillip J. Gilmore, Healdsburg; John I. McCort, Rocklin, both of CA (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/543,456

(22) Filed: Apr. 5, 2000

Related U.S. Application Data

(63) Continuation-in-part of application No. 09/386,196, filed on Aug. 30, 1999, which is a continuation of application No. 08/800,136, filed on Feb. 13, 1997, now Pat. No. 6,006,893
(60) Provisional application No. 60/016,141, filed on Apr. 24, 1996.

(51) Int. Cl.7 .............................................. B65G 15/26
(52) U.S. Cl. ....................................... 198/588; 198/594
(58) Field of Search ................................. 198/588, 594

(56) References Cited

U.S. PATENT DOCUMENTS

| | | | |
|---|---|---|---|
| 2,287,230 A | | 6/1942 | Cartlidge .................... 195/592 |
| 2,558,629 A | * | 6/1951 | Smida ......................... 198/89 |
| 2,812,867 A | | 11/1957 | Anderson .................... 195/592 |
| 2,971,631 A | * | 2/1961 | Gray ........................... 198/119 |
| 3,504,782 A | | 4/1970 | Slagle et al. ................. 198/592 |
| 3,581,874 A | * | 6/1971 | Keith .......................... 198/121 |
| 3,596,785 A | * | 8/1971 | Weatherford, Jr. .......... 214/389 |
| 3,651,963 A | * | 3/1972 | McWilliams ............... 214/6 G |

(List continued on next page.)

FOREIGN PATENT DOCUMENTS

| | | |
|---|---|---|
| DE | 1481347 | 7/1969 |
| DE | 1946195 | 3/1971 |
| FR | 1361570 | 12/1964 |
| FR | 2525570 | 10/1983 |
| GB | 891147 | 3/1962 |
| GB | 220613 A | 8/1988 |

OTHER PUBLICATIONS

Product brochure entitled "Expand–O–Conveyor," published in 1953 by Oliver Farquhar Convetors.
Product brochure entitled "Telescopic Belt Loader," published by Calijan, date unknown.
International Search Report for PCT Application No. PCT/EP 97/01883 mailed Jul. 16, 1997.
Commonly assigned, copending U.S. patent application Ser. No. 09/474,700, filed in Dec. 29, 1999, entitled Extendable Conveyor with Additional Boom Section.
Commonly assigned, copending U.S. Patnet Application Serial No. 09/386,196, filed Aug. 30, 1999, entitled Extendable Trailer Loader/Unloader With User Interface Section.

*Primary Examiner*—Christopher P. Ellis
*Assistant Examiner*—Rashmi Sharma
(74) *Attorney, Agent, or Firm*—Van Dyke, Gardner, Linn & Burkhart, LLP

(57) ABSTRACT

An extendable conveyor has an extendable conveyor section supported in a cantilevered manner including at least one extendable conveyor unit that is extendable between an extended position and a retracted position nested within the extendable conveyor section. The conveyor further includes a user interface section supported in a cantilevered manner from the extendable conveyor unit. The user interface section is vertically adjustable about a horizontal axis and horizontally adjustable about a vertical axis. The extendable conveyor includes a conveying surface defined on the extendable conveyor section and the user interface section. The user interface section is vertically adjustable by an actuator that is preferably an electric motor type linear actuator that is horizontally oriented. This allows the actuator to fit within the side profile of the interface of the user interface section with the extendable conveyor unit.

58 Claims, 12 Drawing Sheets

U.S. PATENT DOCUMENTS

| | | | | |
|---|---|---|---|---|
| 3,717,263 A | * | 2/1973 | McWilliams | 214/6 G |
| 3,752,296 A | | 8/1973 | Peterson | 198/592 |
| 3,819,068 A | * | 6/1974 | Weir | 214/38 |
| 3,827,585 A | * | 8/1974 | McWilliams | 214/41 |
| 3,866,768 A | | 2/1975 | Weir | 198/592 |
| 3,885,682 A | * | 5/1975 | McWilliams | 214/6 G |
| 3,931,897 A | * | 1/1976 | Bacon et al. | 214/6 G |
| 3,982,625 A | | 9/1976 | Wentz et al. | 198/572 |
| 3,993,204 A | * | 11/1976 | Hummel | 214/89 |
| 4,281,955 A | | 8/1981 | McWilliams | 414/398 |
| 4,425,069 A | * | 1/1984 | Saur et al. | 414/398 |
| 4,813,526 A | * | 3/1989 | Belanger | 198/313 |
| 4,924,993 A | * | 5/1990 | Buxton | 193/311 |
| 5,009,560 A | * | 4/1991 | Ruder et al. | 414/392 |
| 5,351,809 A | * | 10/1994 | Gilmore et al. | 198/812 |
| 5,403,142 A | * | 4/1995 | Stewart | 414/392 |
| 5,423,413 A | * | 6/1995 | Gilmore | 198/594 |
| 5,487,462 A | * | 1/1996 | Gilmore | 198/594 |
| 5,568,857 A | | 10/1996 | Chen et al. | 195/592 |
| 5,642,803 A | * | 7/1997 | Tanaka | 198/535 |
| 6,006,893 A | * | 12/1999 | Gilmore et al. | 198/588 |

* cited by examiner

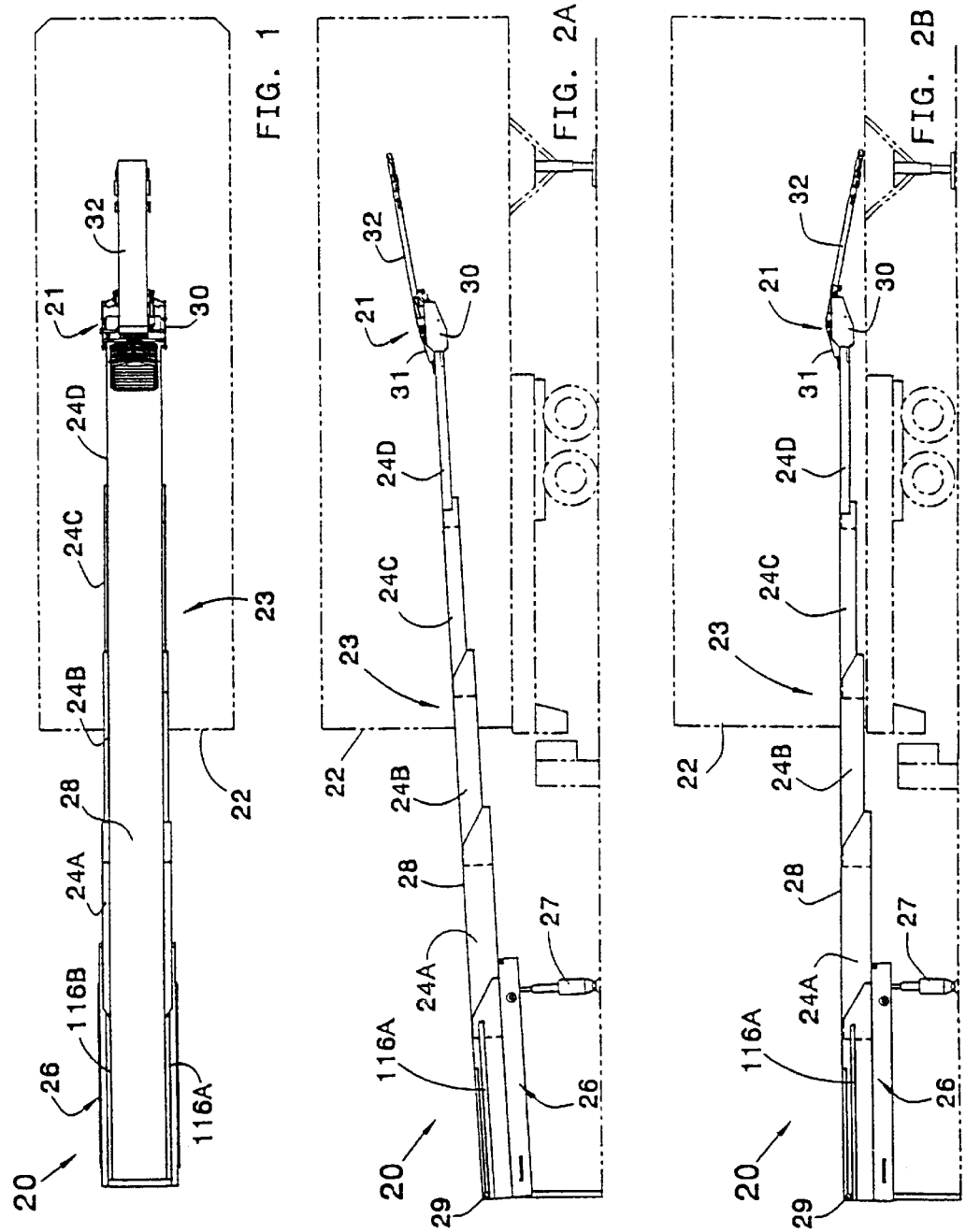

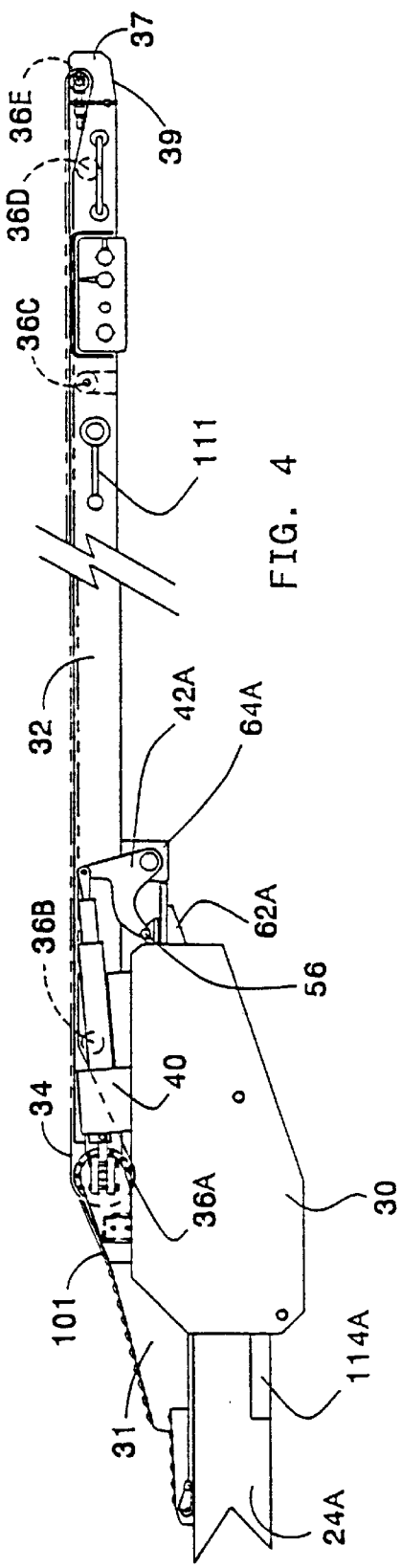
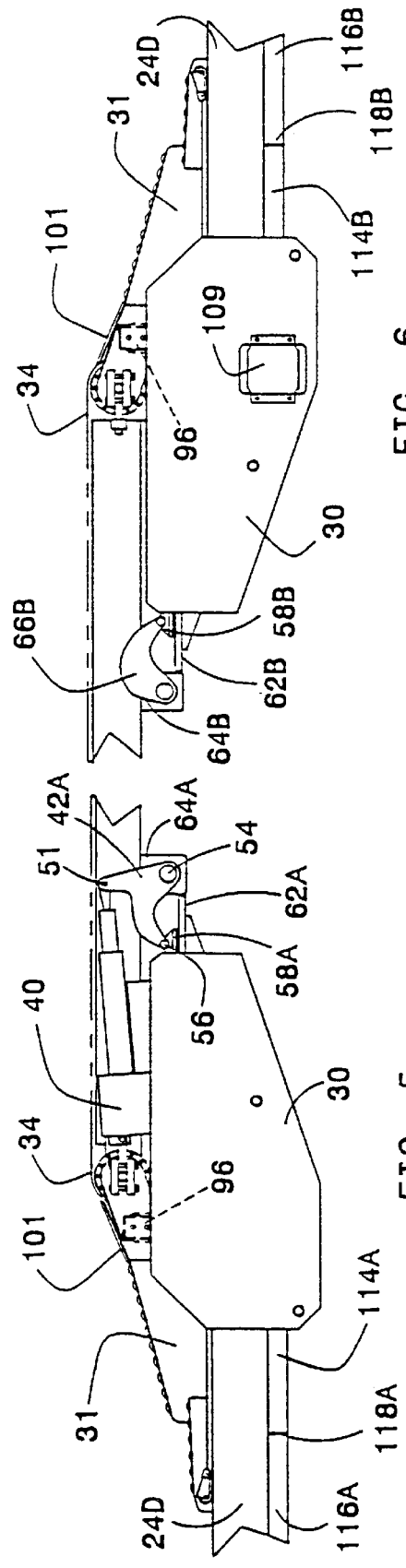
FIG. 4
FIG. 5
FIG. 6

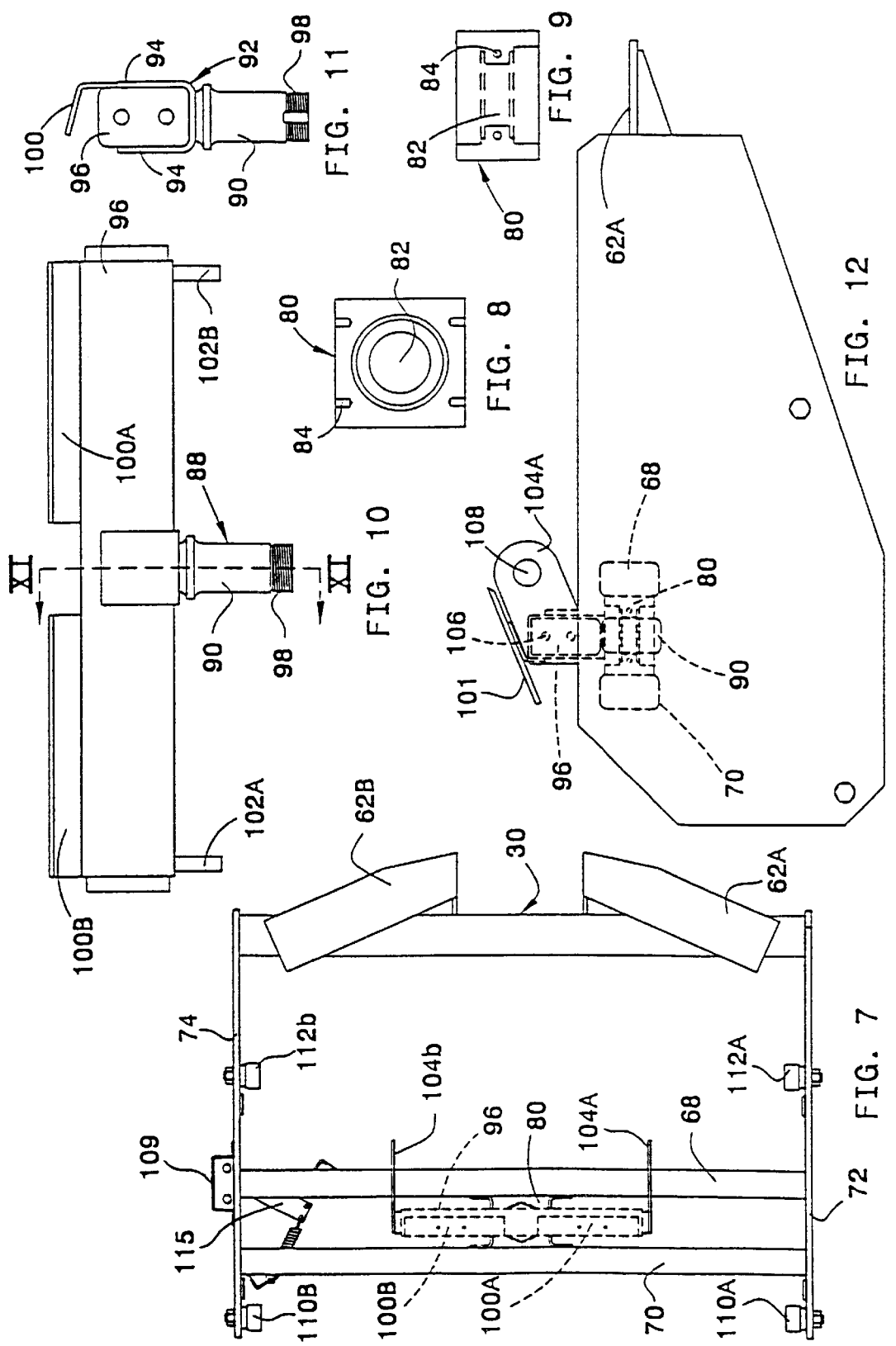

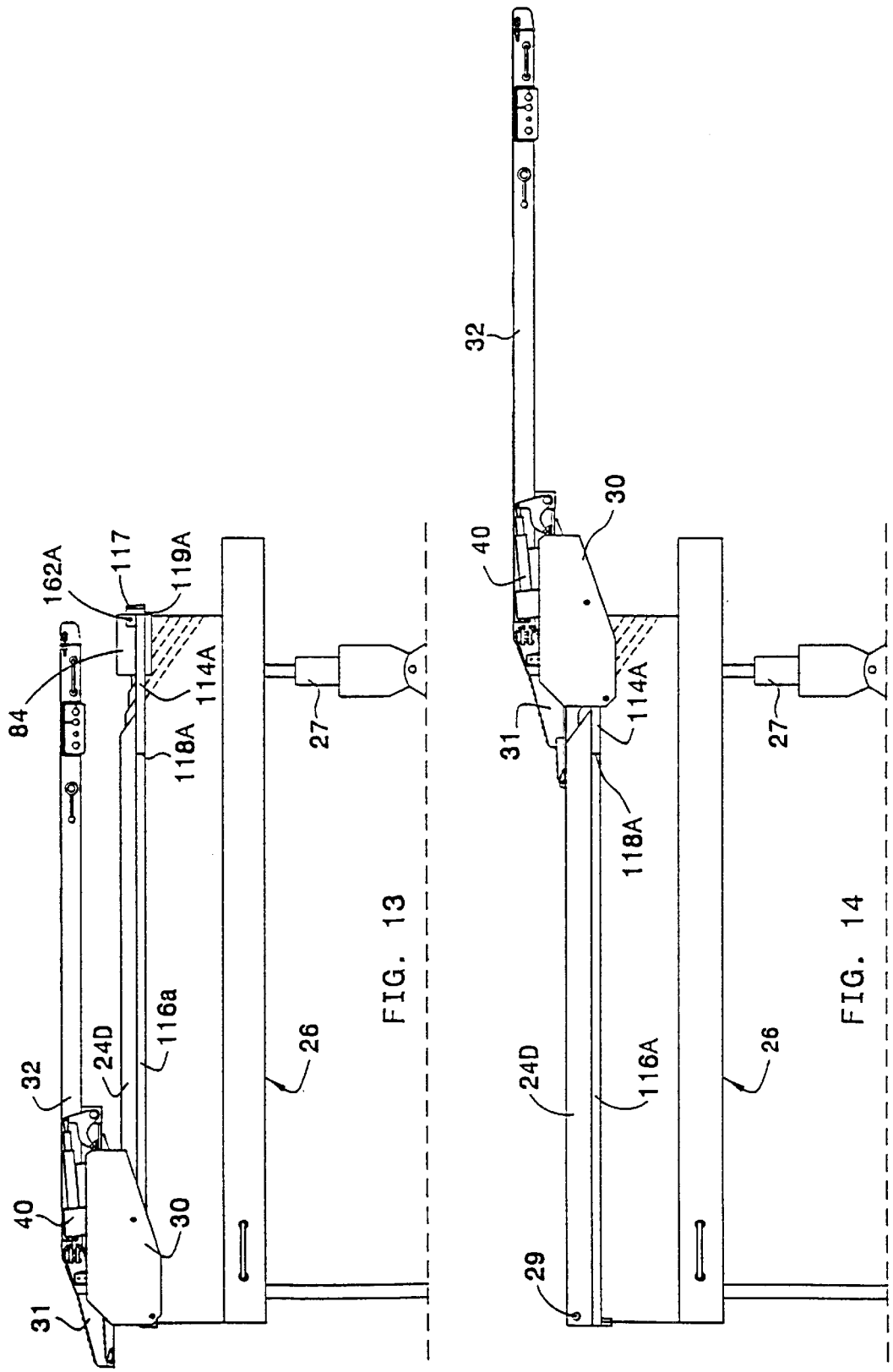

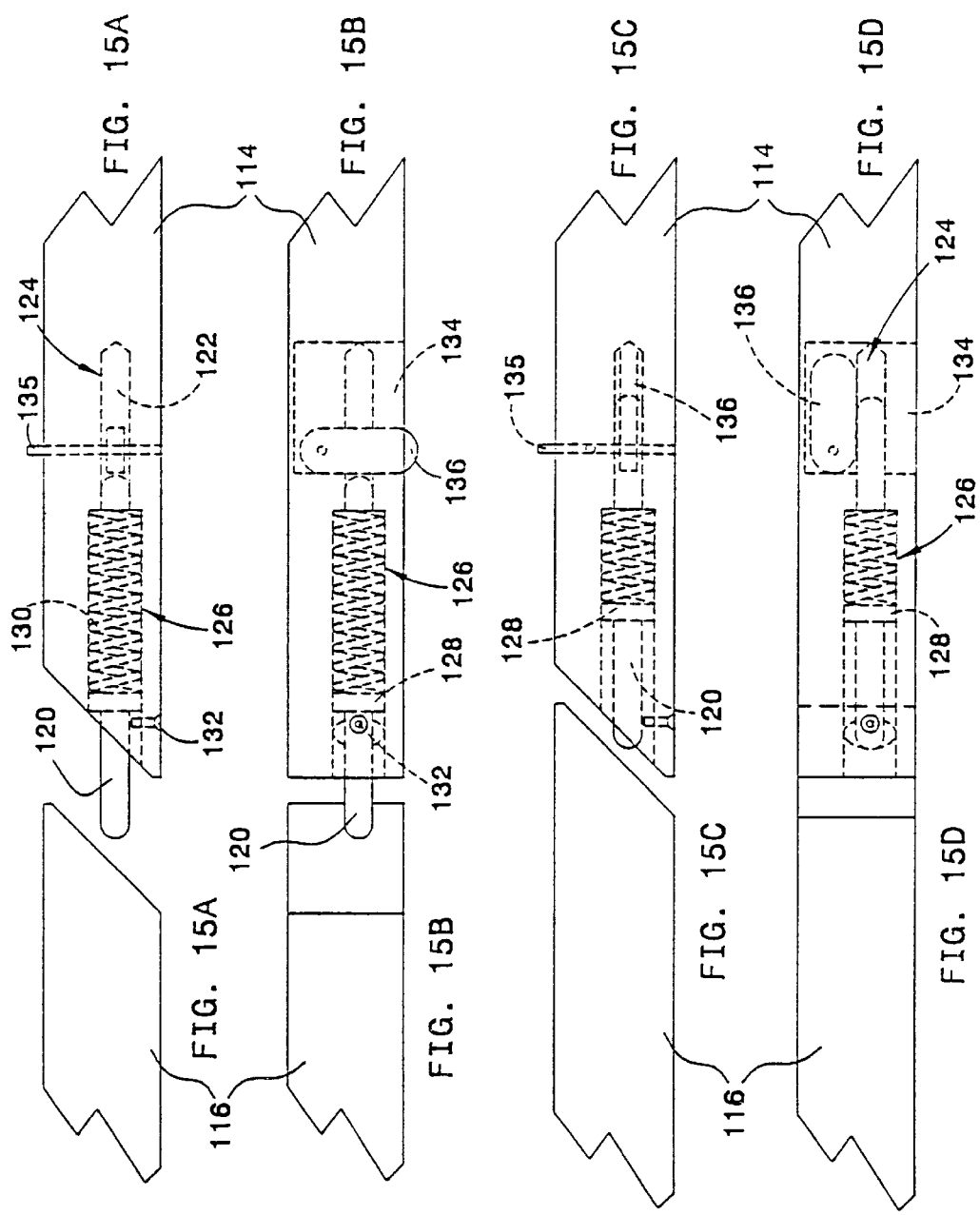

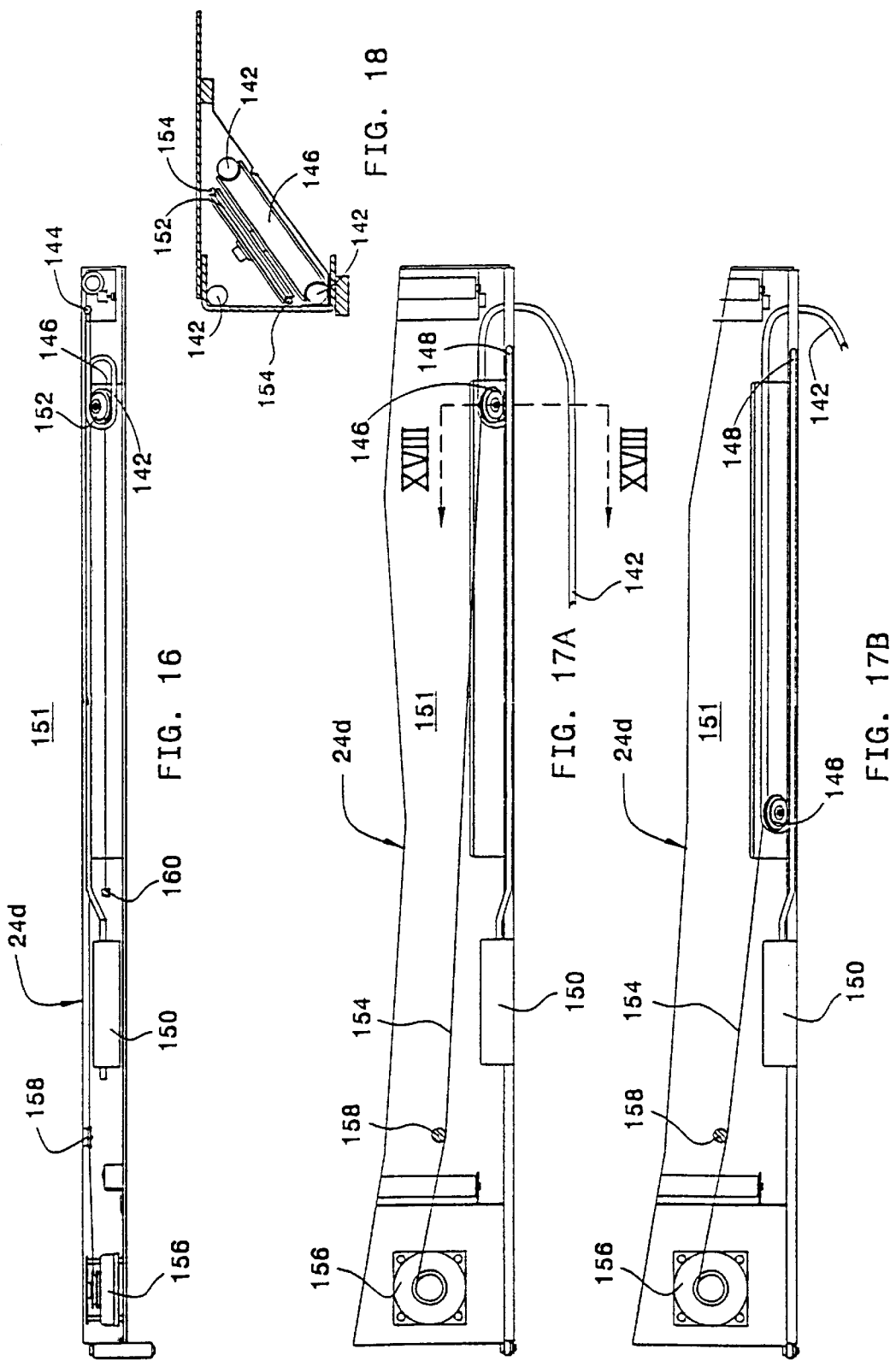

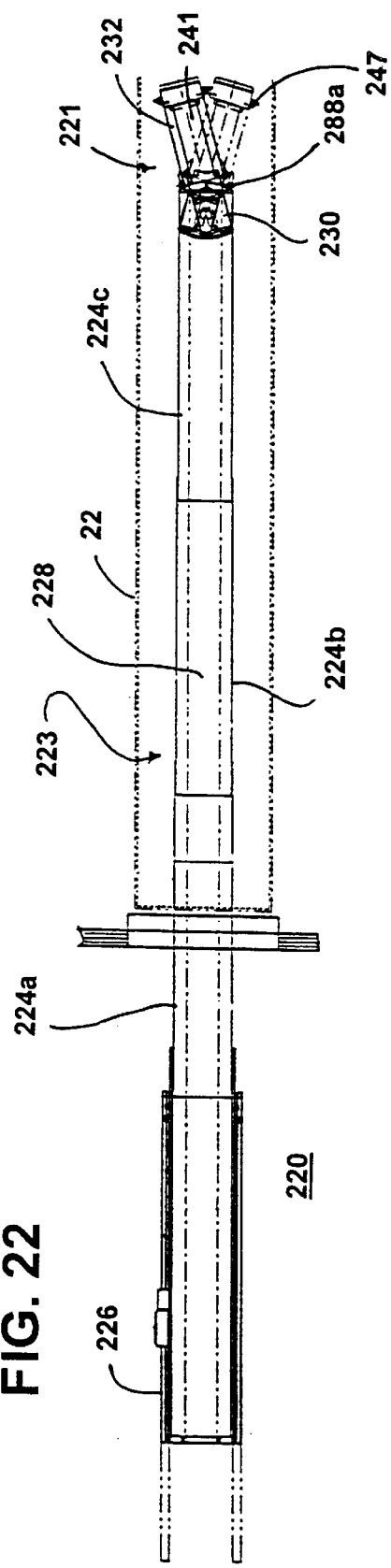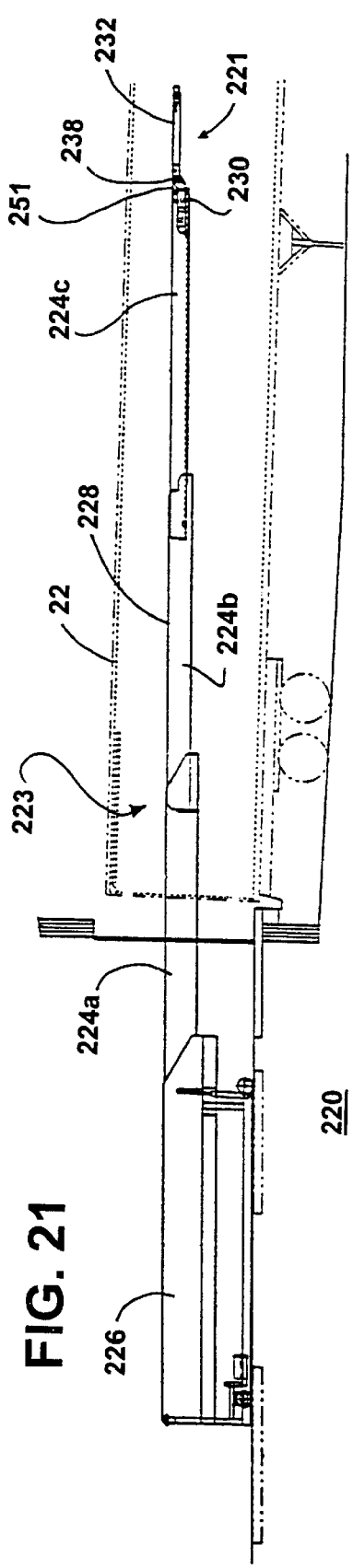

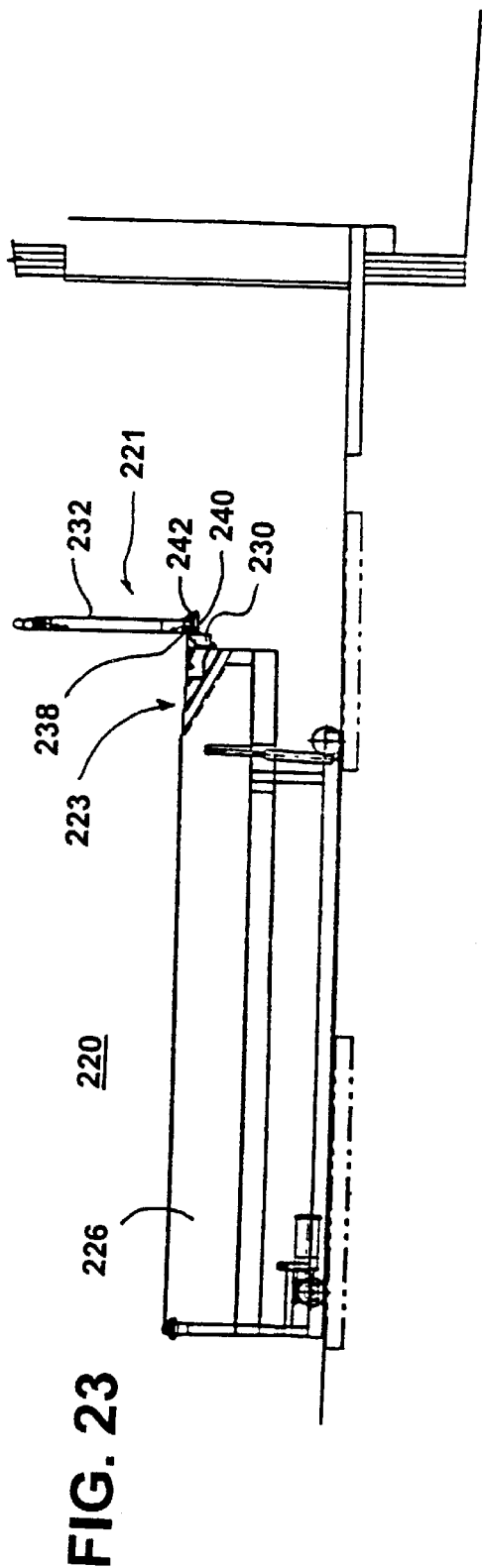
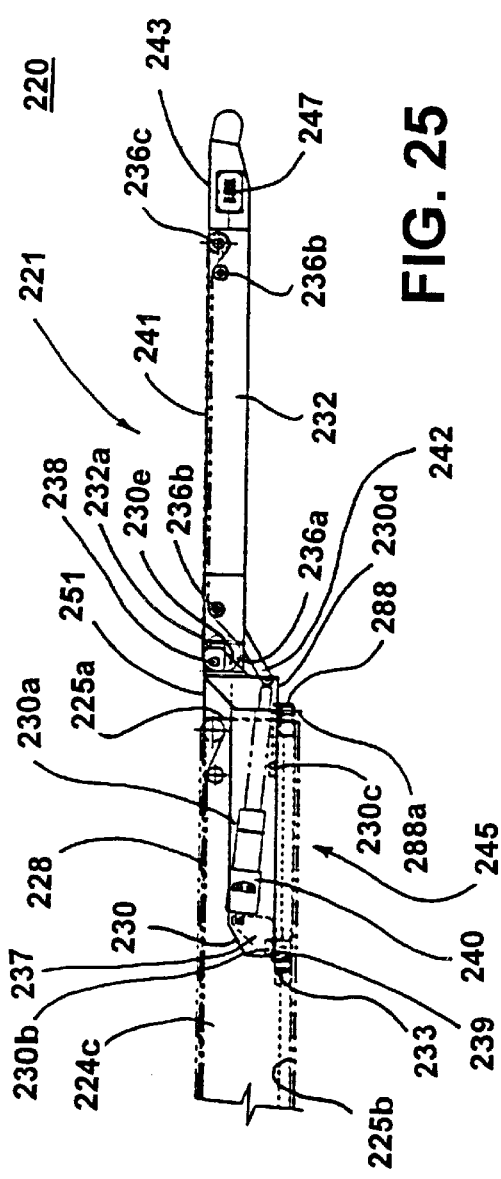

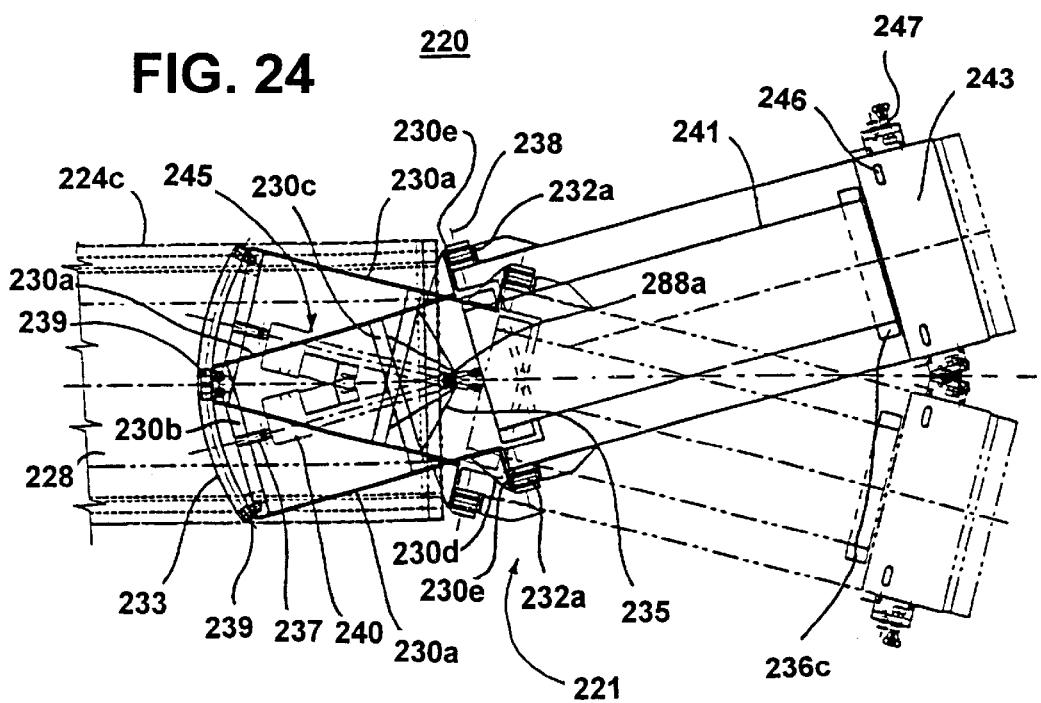
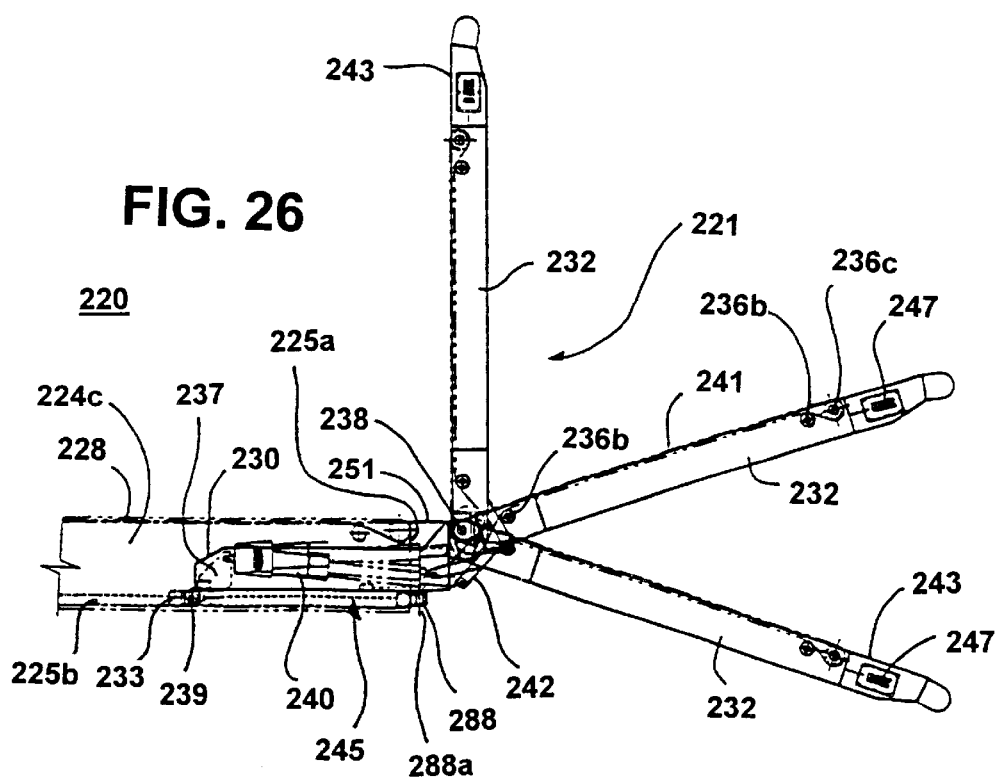

EXTENDABLE TRAILER LOADER/ UNLOADER WITH USER INTERFACE SECTION

CROSS REFERENCE TO RELATED APPLICATIONS

This application is a continuation-in-part of application Ser. No. 09/386,196, filed Aug. 30, 1999, which is a continuation of application Ser. No. 08/800,136, filed Feb. 13, 1997, now U.S. Pat. No. 6,006,893, which claims priority on U.S. Provisional Application No. 60/016,141, filed Apr. 24, 1996.

BACKGROUND OF THE INVENTION

This invention relates generally to conveyors and, more particularly, to extendable conveyors for loading products into, or unloading products from a truck trailer, or the like.

The loading and unloading of packages from truck trailers or the like is typically a physically challenging task. Given the often heavy weight of the packages loaded or unloaded, the cramped working area, and the repetitive lifting of these packages, the task may lead to injuries. With the high costs of labor and worker's compensation insurance, it is highly desirable to provide a machine which reduces both the potential of injuries to workers and the physical labor required to be exerted by the workers.

Extendable conveyors generally provide various benefits to the task of loading or unloading a truck trailer or the like. Of great benefit is the lengthwise extendable nature of the conveyor. By adjustably extending the conveying surface lengthwise, the amount of walking which workers have to perform between the conveyor end and the place where the articles or packages are stacked is reduced. The reduction in walking enables the trailer to be loaded or unloaded in less time and with greater efficiency. Furthermore, because the workers do not have to carry the articles being loaded or unloaded as great a distance, the potential for injuries while carrying possibly heavy articles is reduced.

Prior extendable conveyors, however, have not been without certain disadvantages. Longitudinal extendability places the operator interface closer to the work zone but does not take into account the lateral width of the trailer. Some prior extendable conveyors have designs which allow the extendable conveyor to be moved from side-to-side. This occurs about a pivot axis located outside the trailer truck. However, this requires that the entire length of the conveyor be moved laterally, which is complicated and may require a motor and costly sensing systems. Other examples, include load-out conveyors having an independently pivotable discharge conveyor that is supported on a wheeled vehicle. The wheeled vehicle, however, adds undesirable bulk to the working area and necessitates that the floor of the truck trailer be substantially flush with the floor of the loading dock.

Other difficulties with prior art extendable conveyors having pivotably mounted user interface sections is the inability of the user interface section to be fully retractable into the base unit. This lack of full retractability requires additional space at the loading dock which interferes with efficient operation.

From these examples, it can be seen that it would be highly desirable to provide an extendable conveyor which overcomes the disadvantages discussed above and others, and which has an improved ergonomic design that reduces the potential for worker injuries, and increases efficiency and productivity.

SUMMARY OF THE INVENTION

The present invention is intended to provide an extendable conveyor with improved ergonomic design that reduces the potential for injuries, lowers costs, and increases efficiency. An extendable conveyor for conveying articles between a particular location and a selectable variable location according to the present invention includes a mechanically extendable section supported in a cantilever fashion by a support structure. The mechanically extendable section is extendable along a longitudinal axis between a fully extended position extending forwardly from the support structure and a fully retracted position extending in an opposite direction. A horizontally adjustable user interface section is supported on said mechanically extendable section in a cantilever fashion. The user interface section is horizontally adjustable about the mechanically extendable section with respect to the longitudinal axis. The cantilever support of the boom and mechanically extendable section, along with the horizontal adjustability of the boom provide a greater ease of use of the extendable conveyor.

According to an aspect of the present invention, an extendable conveyor section is supported in a cantilevered manner and includes at least one extendable conveyor unit that is extendable and retractable between an extended position and a retracted position nested within the extendable conveyor section. A user interface section is supported in a cantilevered manner from the extendable conveyor unit. The user interface section is vertically adjustable about a substantially horizontal axis and horizontally adjustable about a substantially vertical axis relative to the extendable conveyor section. A first portion of a conveying surface is defined on the extendable conveyor section and a second portion of the conveying surface is defined on the user interface section. An actuator is operable to vertically adjust the user interface section, whereby the actuator is actuatable in a substantially horizontal direction throughout a full range of vertical adjustment of the user interface section. Preferably, the full range of vertical adjustment is between at least sixty degrees above a generally horizontal orientation and at least approximately ten degrees below the generally horizontal orientation.

According to another aspect of the present invention, an extendable conveyor, which is extendable along a longitudinal axis between a fully retracted position and a fully extended position, is supported in a cantilever fashion by a support structure. The mechanically extendable section has a conveying surface. A user interface section is horizontally adjustable with respect to the longitudinal axis of the extendable section. The user interface section has a conveying portion and a support portion. The support portion is at least partially positioned within the mechanically extendable section and is pivotable about a vertical axis with respect thereto. The conveying portion is supported in a cantilever fashion at the support portion and is pivotable about the vertical axis with the support portion. Preferably, the conveying portion is pivotally mounted at an outer end of the support portion and is vertically adjustable with respect to the support portion and the mechanically extendable section.

In one form, an inner end of the support portion includes at least one roller which provides rolling engagement along an arcuate track within the mechanically extendable section, such that the rollers provide cantilever support for the user interface section at the arcuate track. An actuator may be positioned along the support portion and operable to raise and lower the conveying portion via extension or retraction of the actuator along a generally horizontal path throughout a full range of vertical adjustment of the conveying portion.

According to another aspect of the invention, an extendable conveyor for conveying articles between a particular location and a selectable variable location includes a base unit and one or more extendable conveyor units selectively nested within the base unit. The extendable conveyor units are each adjustably positionable incrementally between a fully nested position within the base unit and a fully extended position telescoped forwardly from the base unit. A user interface section is adjustably positionable between a fully nested position within the base unit and a fully extended position extending forwardly from the furthermost extendable one of the extendable conveyor units. The adjustable positionability of the user interface section allow the extendable conveyor to be retracted into a more compact space, thus freeing up space at the loading dock.

According to another aspect of the invention, an extendable conveyor for conveying articles between a particular location and a selectable variable location includes at least one extendable conveyor unit, a first conveying surface, and a user interface section having a carriage assembly and a boom. The carriage assembly is movably supported on a pair of extendable unit roller bars mounted to the forward end of the furthermost extendable of the extendable conveyor units. The boom has a second conveying surface and is pivotally mounted to the carriage assembly so as to be able to pivot horizontally with respect to the carriage assembly. The horizontal pivotability of the boom and the movability of the carriage assembly on the roller bars allow for a more efficient use of the extendable conveyor.

According to yet another aspect of the invention, an extendable conveyor for conveying articles between a particular location and a selectable variable location is provided which is supported at one end in a cantilever fashion by a support structure. The extendable conveyor further includes at least one extendable conveyor unit having a first conveying surface. The extendable conveyor units are selectively adjustable between a fully extended position extending forwardly from the support structure and a fully retracted position extending in an opposite direction. A carriage assembly is supported on one of the extendable conveyor units which is the furthermost extendable from the support structure. A boom having a second conveying surface is pivotally mounted to the carriage assembly so as to be both vertically and horizontally pivotable with respect to the longitudinal axis of the extendable conveyor units. A height adjustment mechanism adjusts the vertical height of the forward end of the boom and includes a plate mounted on either the boom or the carriage assembly. A shoe is mounted on the other of the boom or the carriage assembly. An actuator is provided for elevating the boom with respect to the plate or the shoe. This unique combination provides both horizontal and vertical adjustability of the boom, which allows the boom to be positioned closer to the work area thereby improving the efficiency of the extendable conveyor.

According to yet another aspect of the invention, an extendable conveyor includes a support structure and one or more extendable conveyor units adjustably positionable with respect to the support structure. The extendable conveyor units are positionable between a fully extended position and a fully retracted position. A user interface section is longitudinally movable with respect to the support structure and along the extendable conveyor unit which is the furthermost extendable from the support structure. An interlock system permits the extendable conveyor units to extend only when the user interface section is positioned on the furthermost extendable of the extendable conveyor units. The interlock system also prevents the user interface section from moving off of the furthermost extendable conveyor unit unless the furthermost extendable conveyor unit is in a fully retracted position. The user interface section can thus be moved to a user-desired location for efficient loading or unloading and can be retracted to a fully rested position within a base unit.

These and other objects, advantages and features of this invention will become apparent upon review of the following specification when read in conjunction with the accompanying drawings.

BRIEF DESCRIPTION OF THE DRAWINGS

FIG. 1 is a plan view of an extendable conveyor according to the invention fully extended into a truck trailer;

FIGS. 2A–B are side elevational views of the extendable conveyor in FIG. 1;

FIG. 4 is a side elevational view of the user interface section of the extendable conveyor;

FIG. 5 is an enlarged view of the area designated V in FIG. 4;

FIG. 6 is the same view as FIG. 5 from the opposite side of the conveyor;

FIG. 7 is a plan view of a carriage assembly with a pivot bar attached;

FIG. 8 is an enlarged plan view of a tapered roller bearing member;

FIG. 9 is an elevational view of the tapered roller bearing member in FIG. 8;

FIG. 10 is a front elevational view of a vertical pivot and pivot bar;

FIG. 11 is a sectional view taken along the line XI—XI in FIG. 10;

FIG. 12 is a side elevational view of the carriage assembly with the pivot-bar and an inclined bridge attached;

FIG. 13 is a side elevational view of the extendable conveyor illustrating the user interface section fully retracted in the base unit;

FIG. 14 is the same view as FIG. 13 illustrating the user interface section at a forward end of the base unit;

FIG. 15A is a fragmentary, plan view of an automatic stop mechanism in a stopped position;

FIG. 15B is a fragmentary, elevational view of the automatic stop mechanism in a stopped position;

FIG. 15C is a plan view of the automatic stop mechanism in a non-stopping position;

FIG. 15D is a fragmentary, elevational view of the automatic stop mechanism in a non-stopping position;

FIG. 16 is an elevational view of extendable conveyor unit 24d;

FIGS. 17A–B are fragmentary, plan views of extendable conveyor unit 24d illustrating a cable retracting unit;

FIG. 18 is a sectional view taken along the line XVIII—XVIII in FIG. 17A;

FIG. 21 is a side elevation of an extendable conveyor extended into a truck trailer with an alternate embodiment of the user interface section at a forward end of the conveyor;

FIG. 22 is a plan view of the extendable conveyor of FIG. 21;

FIG. 23 is a side elevation of the extendable conveyor of FIG. 21 in its fully retracted position;

FIG. 24 is an enlarged plan view of the user interface section of FIG. 22;

FIG. 25 is an enlarged side elevation of the user interface unit of FIG. 21; and FIG. 26 is the same side elevation as FIG. 25, with the user interface section shown in various raised and lowered positions with respect to the extendable conveyor.

DESCRIPTION OF THE PREFERRED EMBODIMENTS

Figure 3:
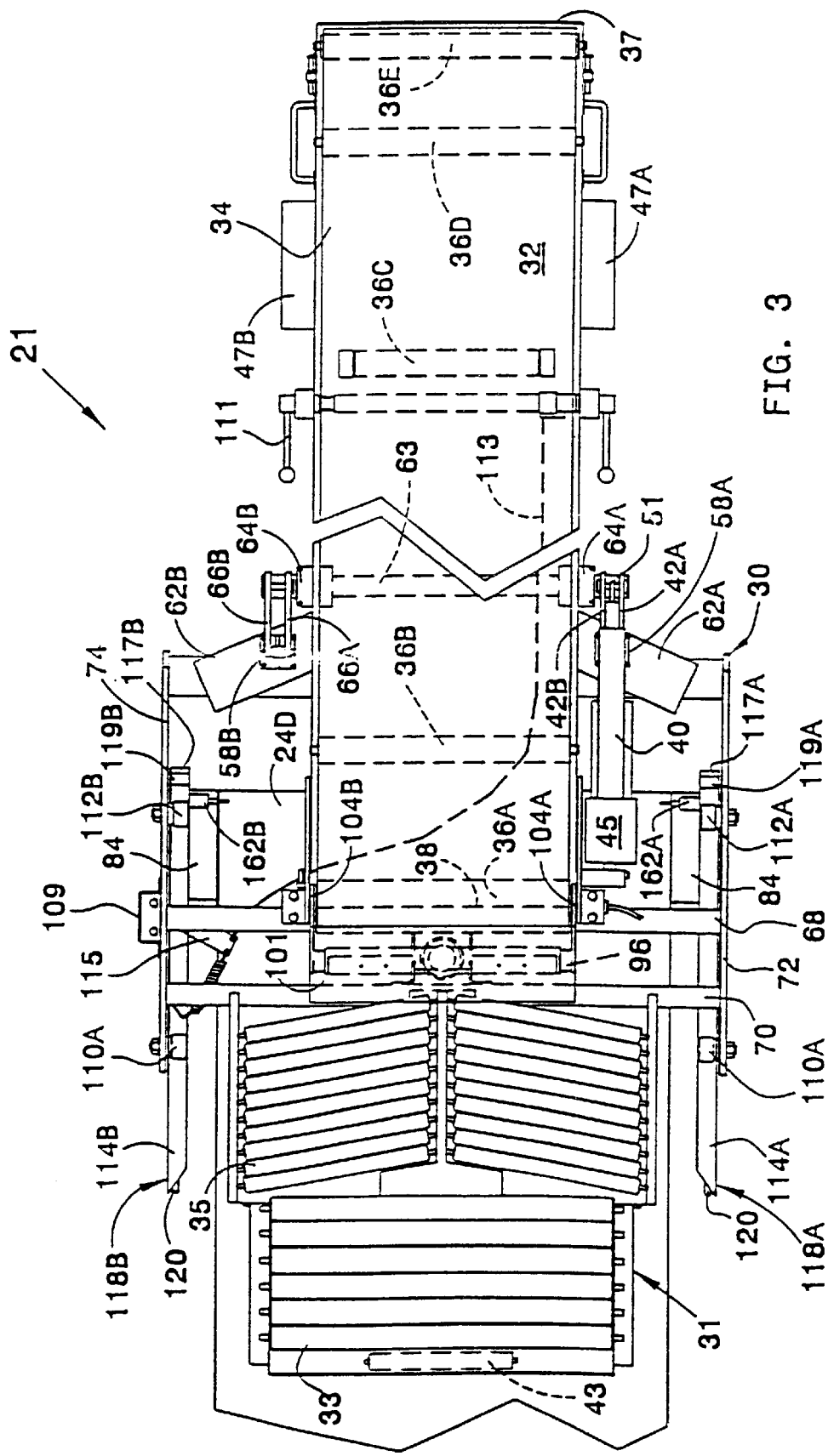
FIG. 3 is a plan view of a user interface section of the extendable conveyor.

Referring now specifically to the drawings, and the illustrative embodiments depicted therein, a multiple-stage extendable conveyor 20 extends from a feed or take-away conveyor (not shown) toward a selectable variable location, such as in a truck trailer 22, or the like (FIGS. 1–2). Extendable conveyor 20 includes a mechanical extendable section 23 and a user interface section 21 located at an end of mechanical extendable section 23 adjacent the selectable variable location. Extendable section 23 is supported in a cantilever fashion by a base unit 26, or other type of support structure, which may include a vertical actuator 27 capable of vertically pivoting extendable section 23 about a support pivot 29. Vertical actuator 27 may be pneumatic, hydraulic, or otherwise mechanically powered as would be understood by one skilled in the art. Extendable section 23 may include one or more extendable conveyor units 24a–d. Extendable conveyor units 24a–d are movable with respect to each other in a telescoping fashion between a fully extended position (depicted in FIGS. 1–2) and a fully retracted position within base unit 26 (depicted in FIG. 13). The width of extendable conveyor unit 24b is slightly narrower than the width of extendable conveyor unit 24a, as is the width of extendable conveyor unit 24c with respect to extendable conveyor unit 24b, and likewise extendable conveyor unit 24d with respect to extendable conveyor unit 24c (FIG. 1). The progressively narrower widths of extendable conveyor units 24a–d allow extendable conveyor units 24a–d to be fully retracted essentially within and on top of each other. The details of extendable conveyor units 24a–d are disclosed in U.S. Pat. No. 5,351,809, the disclosure of which is hereby incorporated herein by reference and will not be repeated herein. Suffice it to say that the telescoping movement of extendable conveyor units 24a–d is motorized and under the control of a human operator. When the operator directs extendable section 23 to expand or retract, extendable conveyor units 24a–d will simultaneously expand or retract at controlled relative rates. Alternatively, the multiple-stage extendable conveyor may be of the type which is supported by a support structure other than a base unit, as is disclosed in U.S. Pat. No. 5,487,462, the disclosure of which is hereby incorporated herein by reference.

A conveying surface, such as a single endless belt 28 runs longitudinally along the length of extendable conveyor units 24a–d and is powered by a motor (not shown). Belt 28 is reeved through base unit 26 and extendable conveyor units 24a–d in such a way so that excess slack is taken up as mechanically extendable section 23 retracts rearwardly and additional belt length is provided as mechanically extendable section 23 extends forwardly as is well known in the art. For purposes of description, the term "rearwardly" will be used to designate the direction pointing toward the support structure or base unit, and the term "forwardly" will be used to describe the opposite direction pointing toward the selectable variable location. However, the use of such terms is not intended to be limiting unless so specified. The reeving of belt 28, and the manner in which it expands or retracts in accordance with the varying length of extendable conveyor 20 is also disclosed in the above referenced U.S. Pat. No. 5,351,809. Other conveying surfaces, such as, for example, powered or gravity rollers may be used. Such powered conveying surfaces may be powered rearwardly for an unloading extendable conveyor or forwardly for a loading extendable conveyor.

User interface section 21 includes an adjustable boom 32 which is pivotally mounted to, and supported by, a carriage assembly 30. Carriage assembly 30 is supported in a cantilever fashion on the furthermost extendable conveyor unit 24d. A roller assembly 31 extends rearwardly from carriage assembly 30 in order to provide a surface interface between boom 32 and extendable conveyor unit 24d (FIGS. 3–4). Roller assembly 31 includes a rear set of rollers 33 and an adjacent forward set of rollers 35 which slopingly ascend toward boom 32. Rear set of rollers 33 are slidable underneath forward set of rollers 35 when carriage assembly 30 is retracted fully rearward on base unit 26. A support roller 43 rides directly on conveyor belt 28 and rearwardly supports roller assembly 31 (FIG. 3). It will be appreciated by those skilled in the art that a variety of differently configured roller assemblies which bridge boom 32 with conveyor belt 28 may alternatively be used.

Boom 32 includes an endless belt 34 reeved around a set of rollers defining a conveying surface 41 (FIGS. 3–5). Roller 36a is motorized and powers the movement of belt 34 in either direction depending upon whether extendable conveyor 20 is being used for loading or unloading. Roller 36a defines a horizontal pivot axis 38 about which boom 32 pivots vertically, as will be described below. Boom belt 32 is reeved around roller 36a, rides on top of roller 36b, c, d, and is reeved around forward roller 36e. Boom 32 includes two control panels 47a, 47b mounted on either side of boom 32 which enable a user to operate extendable conveyor 20 from user interface section 21. An endpiece 37 of boom 32 has an angled, bottom edge 39 which is adapted to rest substantially flush against the floor when boom 32 is lowered downward. Endpiece 39 also prevents belt 32 from rubbing against the floor when boom 32 is lowered to the floor. In the preferred embodiment endpiece 39 is made of steel in order to withstand the stresses of repeated bumping against the floor.

Boom 32 is vertically adjustable about a horizontal pivot axis 38 between an upper and lower limit by way of a height adjustment mechanism 45. Height adjustment mechanism 45 includes a pair of shoes 58a, 58b, attached in the illustrated embodiment to boom 32 and each slidably resting on a winged platform, or plate, 62. Plates 62 are in the illustrated embodiment to carriage assembly 30. Height adjustment mechanism 45 further includes an actuator for extending the boom with respect to the shoe/platform interface. The actuator is made up of a linear motor 40, longitudinally extendable in a piston-like fashion between a fully extended position and a fully retracted position. Electric actuator 40 powers the vertical movement of boom 32 between the upper and lower limits. Electric actuator 40 is rotatably secured at its forward end to two triple-pronged lever members 42a–b by a pin 51, or the like, inserted through a circular aperture in one of the prongs of the triple-pronged lever members 42a–b. Triple-pronged lever members 42a–b additionally include apertures 54a–b and 56a–b adjacent the ends of each of the remaining two prongs. Apertures 56a–b are used in conjunction with a pin, or the like, to rotatably secure the prongs to a shoe 58a. Shoe 58a slidably rests on a winged platform, or plate, 62a extending forwardly from carriage assembly 30. Apertures 54a and 54b are used to rigidly secure triple-pronged lever members 42a–b to a torque bar 63 secured underneath boom 32 by attachment bearings 64a–b attached at opposite sides of boom 32 (FIG. 3). Torque bar 63 is secured at an end opposite triple-pronged lever members 42a–b to two double-pronged lever members 66a–b. Double-pronged lever members 66a–b are rotatably connected at the other prong to a shoe 58b. Winged platform 62b is substantially symmetrical to winged platform, or plate, 62a. To facilitate the sliding of shoes 58a–b on winged platforms 62a–b, it is preferred that the top surface of winged platforms 62a–b be defined with a low-friction surface, such as one defined by a plastic material, and that the bottom surfaces of shoes 58a–b be covered with a different plastic material. In the illustrated embodiment, the bottom surface of shoes 58a–b is a mixture of nylon and teflon, and the plastic top surface of winged platforms 62a–b is ultra-high molecular weight (UHMW) polypropylene or polyethylene. It will be appreciated by one skilled in the art that height adjustment mechanism 45 may be alternately constructed with platforms 62a–b positioned on boom 32 and shoes 58a–b gliding along the underside of plates 62a–b. Other low-friction surfaces such as wheels or balls may also be used.

Figure 19A:
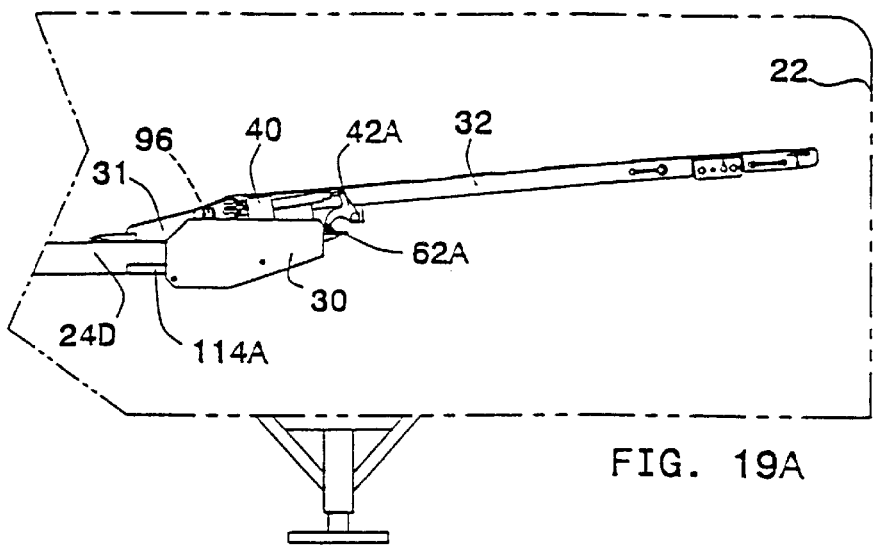
FIGS. 19A–C are elevational views of the user interface section illustrating the vertical pivoting of the boom.
Figure 19B:
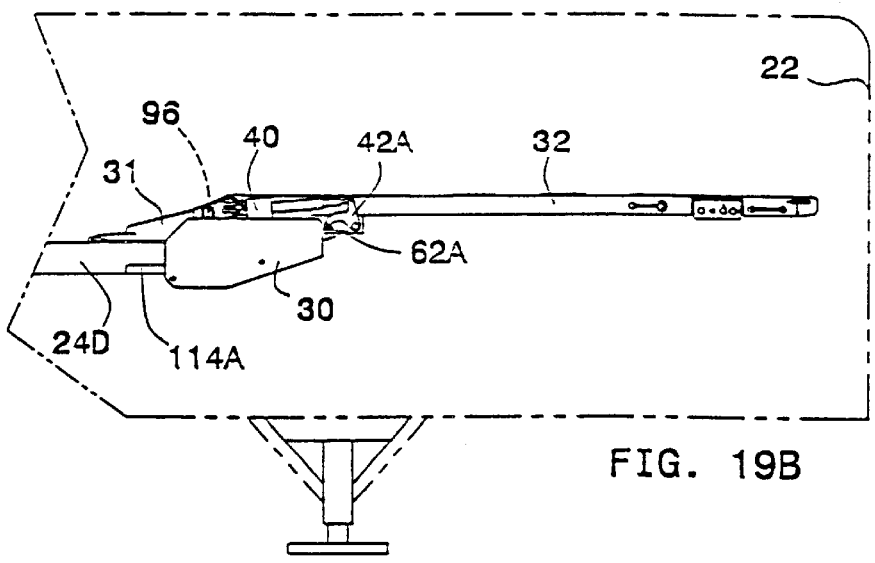
Figure 19C:
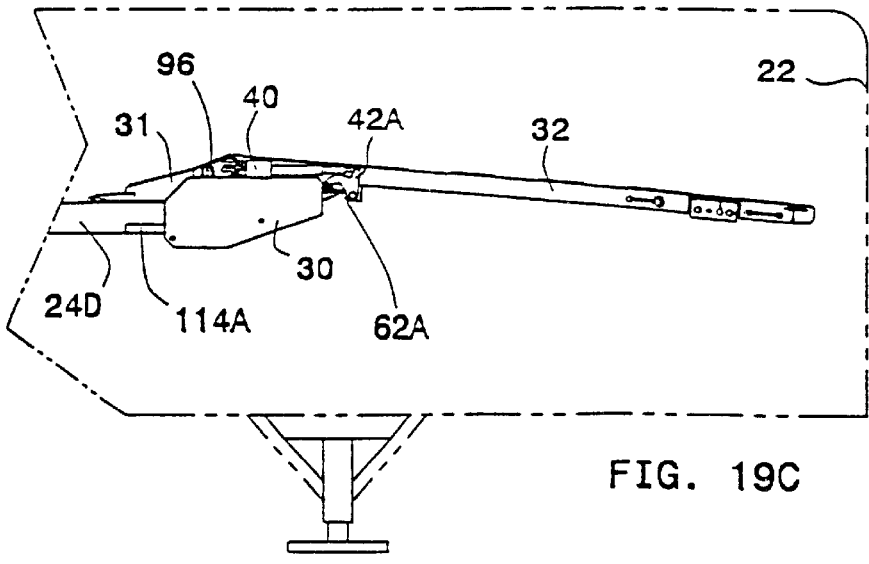

When a user directs boom 32 to pivot to a lower position via control panel 47, electric actuator 40 is activated and increases in length in a piston-like fashion thereby exerting a torque on triple-pronged lever members 42a–b in a clockwise direction (as seen in FIG. 5). The clockwise rotation of triple-pronged lever members 42a–b moves triple-pronged apertures 54a–b to a lower elevation, altering the vertical distance between platforms 62a–b and boom 32 and thereby moving boom 32 to a lower elevation (see FIG. 19C). The torque exerted on triple-pronged lever members 42a–b by electric activator 40 will be transferred via torque bar 63 to double-pronged lever members 66a–b. Double-pronged lever members 66a–b will therefore likewise rotate on the opposite side of boom 32 and boom 32 will consequently be lowered and supported evenly on both of its sides. Boom 32 will pivot about horizontal axis 38. When a user directs boom 32 to pivot to a higher position via control panel 47, electric actuator 40 is activated and decreases in length in a piston-like fashion, thereby rotating tripled pronged lever members 42a–b counterclockwise. Double-pronged lever members 66a–b will also be rotated via torque bar 63, and together they will raise boom 32 by pushing against winged platforms 62a–b (see FIGS. 19A–B). The vertical pivoting of boom 32 with respect to carriage assembly 30 is limited to a lower and upper limit. When an operator directs boom 32 via control panel 47 to pivot to a vertical height greater than the upper limit of boom 32 the control circuitry for extendable conveyor 20 will activate vertical actuator 27 so that the entire conveyor will pivot upward about support pivot 29 as seen in FIG. 2a. Likewise, when an operator directs boom 32 to pivot to a lower position after boom 32 has reached its lower limit, the control circuitry for extendable conveyor 20 will activate vertical actuator 27 so that the entire conveyor will pivot downward about support pivot 29 as seen in FIG. 2B.

Figure 20A:
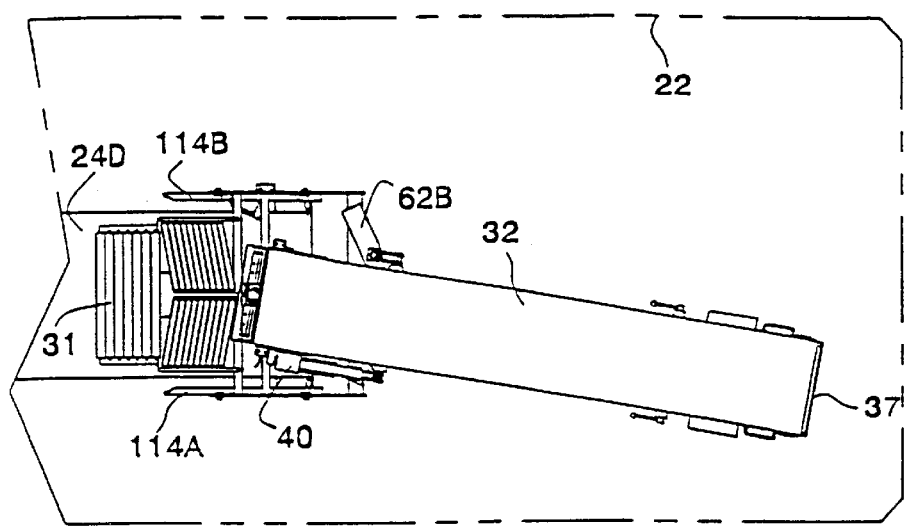
FIGS. 20A–C are plan views of the user interface section illustrating the horizontal pivoting of the boom.
Figure 20B:
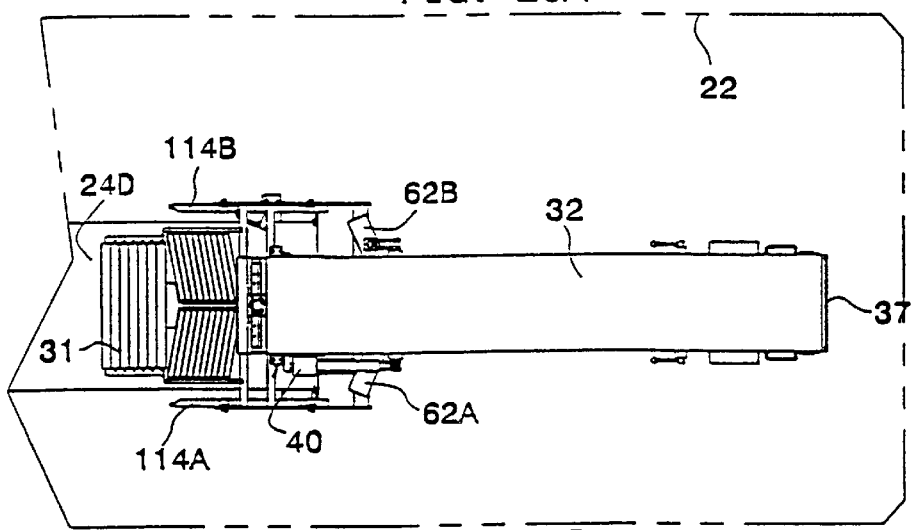
Figure 20C:
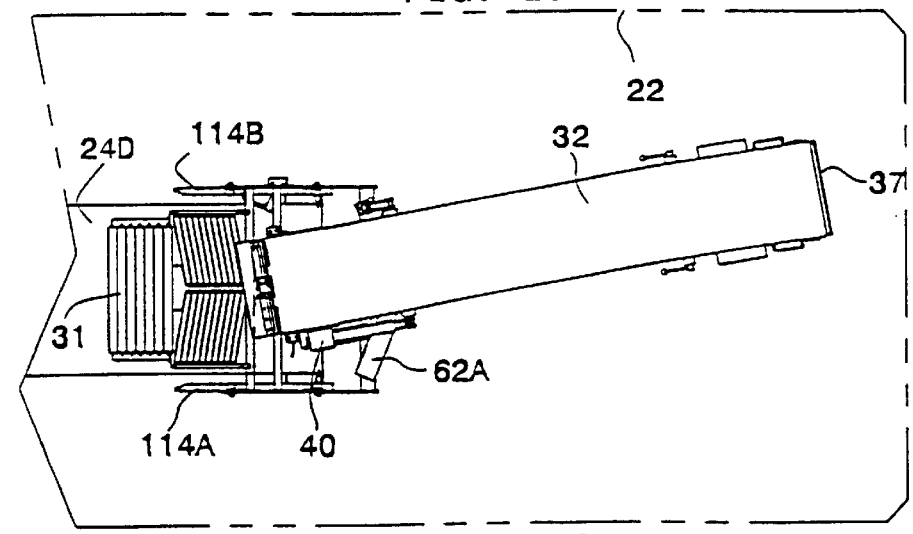

Boom 32 is also manually, horizontally pivotable from side to side with respect to carriage assembly 30, as can be seen by comparing FIGS. 20A–C. Carriage assembly 30 includes a forward crossbar 68 and a rear crossbar 70 extending substantially parallel to each other and laterally between carriage assembly sides 72 and 74 (FIG. 7). Two "U" shaped supports 76a–b are secured midway to crossbars 68 and 70. Supports 76a–b are welded, or otherwise securely fastened, at their ends to crossbars 68 and 70. A tapered roller bearing member 80 is secured between "U" shaped supports 76a–b by four screws 78a–d, or the like, which are inserted in pairs through apertures in supports 26a–b into tapered roller bearing member 80. Tapered roller bearing member 80 includes a central, circular, vertical bore which defines a vertical bearing 82 (FIGS. 8 and 9). A vertical shaft 88, which defines the pivot axis of boom 32 is inserted through vertical bearing 82 (FIGS. 10–12). When boom 32 is pivoted horizontally, vertical shaft 88 rotates in tapered roller bearing member 80. Shoes 58a–b slide along winged platforms, or plates 62a–b, thereby enabling lever members 42a–b and 66a–b to support boom 32 on platforms 62a–b at a desired location while boom 32 is pivoted horizontally.

Vertical shaft 88 includes a cylindrical body portion 90 and a "U" shaped rectangular head portion 92. "U" shaped rectangular head portion 92 is made up of two arms 94 between which a pivot bar 96 is welded, or otherwise securely fastened. At a lower end of vertical shaft 88 are external threads 98 which are adapted to receive and secure a nut (not shown) to vertical shaft 88 after insertion through vertical bearing 82. Vertical shaft 88 and pivot bar 96 are free to rotate within vertical bearing 82 of tapered roller bearing member 80 while the nut secured on external threads 98 secures vertical shaft 88 in tapered roller bearing member 80. Two downwardly extending posts 102a–b attached at opposite ends of pivot bar 96 limit the angular movement of pivot bar 96 by contacting crossbars 68 and 70 at the angular extremes (FIG. 10). Two inclined bridge supports 100a–b are securely fastened to pivot bar 96, by welding or otherwise. Inclined bridge supports 100a–b support an inclined bridge 101 which serves to further bridge the gap in the conveying surface between boom belt 34 and roller assembly 31 (FIG. 12). Securely fastened to each end of pivot bar 96 is a mounting 104 which is secured to pivot bar 96 by two screws 106 or the like. A circular aperture 108 is defined in each mounting plate 104a–b in order to support axis 38 of roller 36a. Axis 38 of roller 36a also forms the horizontal pivot axis for vertical pivoting of boom 32, as described above.

Carriage assembly 30 is supported for longitudinal movement along extendable conveyor unit 24d by a pair of rearward support rollers 110a–b and a pair of forward support rollers 112a–b secured to carriage assembly sides 72 and 74 (FIG. 3). Support rollers 110a–b and 112a–b manually roll along a pair of longitudinally oriented, substantially parallel, extendable conveyor unit roller bars, or support rails, 114a–b which are attached to extendable conveyor unit 24d. Extendable conveyor unit roller bars 114a–b extend along only a forward portion of extendable conveyor unit 24d. In the illustrated embodiment, extendable conveyor unit roller bars 114a–b are each secured to extendable conveyor unit 24d by way of a connection bar 84 welded, or otherwise securely fastened, to the forward end of roller bars 114a–b and extendable conveyor unit 24d. Another pair of longitudinally oriented, substantially parallel, base roller bars, or support rails, 116a–b are attached to base unit 26 (FIGS. 13 and 14). When extendable conveyor unit 24d has been retracted into base unit 26, extendable conveyor unit roller bars 114a–b will contact base roller bars 116a–b and form an essentially continuous pair of collinear rolling surfaces for support rollers 110a–b and 112a–b. When extendable conveyor unit 24d is not retracted onto base unit 26, but is extended forwardly therefrom, extendable conveyor unit roller bars 114a–b will be disconnected from base roller bars 116a–b (see FIGS. 1–2). Carriage assembly 30 is prevented from rolling forwardly off of roller bars 114a–b by fixed stops 117a–b secured by screws or the like to the forward ends of roller bars 114a–b. A strip of neoprene rubber 119 is attached on the rearward side of each static forward interlock 117 to cushion impacts of forward support rollers 112a–b with forward interlocks 117. In the illustrated embodiment, support rollers 110a–112b are defined by cam-followers.

The range of movement of carriage assembly 30, and thus user interface section 21, on extendable conveyor unit roller bars 114a–b and base roller bars 116a–b is controlled by a system of interlocks. The interlock system includes a forward; set of electrical interlocks 162a–b on a forward end of extendable conveyor unit 24d adjacent forward stops 117a–b (FIG. 3). The interlock system also includes a rearward set of mechanical interlocks 118a–b located at the rearward end of extendable conveyor unit roller bars 114a–b. Forward interlocks 162a–b permnit extendable conveyor units 24a–d to extend only when user interface section 30 is positioned on extendable conveyor unit roller bars 114a–b. Rearward interlocks 118a–b prevent user interface section 21 from moving rearwardly off of extendable conveyor unit roller bars 114a–b unless extendable conveyor unit 24d is in a fully retracted position. Thus, when extendable conveyor 20 is in a fully retracted position, user interface section 21 is movable along both extendable conveyor unit roller bars 114a–b and base roller bars 116a–b. The details of forward and rearward interlocks 162 and 118 are described below.

Each rear mechanical interlock 118a–b includes a contact pin 120 slidably inserted into a longitudinally extending bore 122 in roller bar 114 (FIGS. 15A–D). Longitudinal bore 122 includes an innermost section 124 of reduced diameter and an outermost section 126 of enlarged diameter. A rim 128 on contact pin 120 has a circumference slightly smaller than the enlarged circumference of outermost section 126 and is adapted to slide longitudinally within outermost section 126. Rim 128 engages and retains a spring 130 within outermost section 126 of longitudinal bore 122. A retainer screw 132 is inserted into roller bar 114 perpendicularly to longitudinal bore 122 and protrudes partially into longitudinal bore 122 adjacent its opening. Retainer screw 132 prevents contact pin 120 and spring 130 from being removed from longitudinal bore 122 by obstructing and preventing rim 128 from moving past. A stop lever 136 is housed in a recessed area 134 partially surrounding a portion of innermost section 124 of longitudinal bore 122. Stop lever 136 is pivotally secured to roller bar 114 at an end located above longitudinal bore 122. Stop lever 136 rotates on an axis pin 135. When extendable conveyor unit roller bar 114 abuts against base roller bar 116, contact pin 120 is pushed into longitudinal bore 122 and rotates stop lever 136 upwardly (FIGS. 15C–D). When stop lever 136 is rotated upwardly by contact pin 120, roller 110 is free to roll along bottom surface 138 of roller bar 114 and may freely roll onto bottom surface 140 of abutting base roller bar 116. When base roller bar 116 does not abut roller bar 114, spring 130 partially pushes contact pin 120 out of longitudinal bore 122 until rim 128 contacts retainer screw 132 (FIGS. 15A–B). When contact pin 120 is pushed out of longitudinal bore 122 in this fashion, stop lever 136 is rotated downwardly by the force of gravity and stops rear support roller 110 from moving past it along bottom surface 138. In this fashion, rear interlocks 118 automatically allow carriage assembly 30 to roll from base roller bars 116 to extendable conveyor unit roller bars 114 only when base roller bars 116 are in abutting contact with extendable conveyor unit roller bars 114.

Electrical forward interlocks 162a–b are proximity sensors which detect the presence of carriage assembly 30 when it has been rolled all the way forward on roller bars 114a–b of extendable conveyor unit 24d and permit activation of the electric motor which extends the extendable units. In the preferred embodiment, proximity sensors 162a–b are sensors sold by the Allen Bradley Company and having the part number 872C-A10N18-R3. The detection of the presence of carriage assembly 30 by proximity sensors 162a–b results in an electrical signal being sent to the control circuitry (not shown) of extendable conveyor 20. The control circuitry will only allow the extension of extendable conveyor units 24a–d after the presence of carriage assembly 30 has been detected and a user has directed extendable conveyor 20 to extend out further. By the combination of the automatic extension of extendable conveyor units 24a–d and the manual sliding of carriage assembly 30 on base unit 26 and extendable conveyor unit 24d, the longitudinal position of boom 32 can be selectively adjusted to any location between a fully retracted position and a fully extended position.

Carriage assembly 30 is selectively prevented from rolling along roller bars 144a–b and base roller bars 116a–b when carriage assembly 30 is in a desired location by a brake mechanism 109 (FIG. 3). Brake mechanism 109 is attached to side 74 of carriage assembly 30 between rollers 110b and 112b. Brake mechanism 109 is defined by a caliper-type brake pad assembly, or the like, which selectively and securely grips roller bar 144b or base roller bar 116b, depending upon the current position of carriage assembly 30. The brake pads grip roller bars 144b or 116b securely enough to prevent carriage assembly 30 from rolling. Brake mechanism 109 is activated and deactivated by a user by way of a brake handle 111 positioned forwardly of carriage assembly 30 on boom 32. Turning brake handle 111 activates or deactivates brake mechanism 109 via a brake cable 113 extending between the two. In particular, turning brake handle 111 either increases or decreases the tension on brake cable 113 which turns a brake lever 115. Brake lever 115 in turn activates the brake pads of brake mechanism 109 when turned in one direction and deactivates the brake pads of brake mechanism 109 when turned in the opposite direction. Preferably, a biasing mechanism biases the brake lever in a position which engages the brakes. As will be appreciated by those skilled in the art, a variety of different types of brakes may be used with the present invention.

Electrical power is supplied to control panels 47a, 47b, and other electrical components of user interface section 21 by means of a cable 142 extending from extendable conveyor unit 24d to user interface section 21. A cable retracting unit 151 releases cable 142 when carriage assembly 30 is extended forwardly and retrieves excessive cable length when carriage assembly 30 is extended rearwardly (FIGS. 16, 17A–B). Cable 142 is threaded through a hole 144 in a side of extendable conveyor unit 24d adjacent the forward end of extendable conveyor unit 24d. Cable 142 wraps partially around a longitudinally slidable sheave 146, extends forwardly to attachment point 148 on a side of extendable conveyor unit 24d, and thereafter extends rearwardly along the side of the extendable conveyor unit 24d to electrical box 150. Sheave 146 is longitudinally slidable along a portion of the side of extendable conveyor unit 24d extending from a rear position adjacent electrical box 150 to forward position adjacent attachment point 148. Attached concentrically on top of sheave 146 is a smaller tension sheave 152 (FIG. 18). A tension wire 154 extends forwardly from a tension reel 156, which may be a spring motor or the like, passes along guidance sheave 158, continues forwardly and wraps approximately semi-circularly around tension sheave 152, and then continues rearwardly back to a wire attachment point 160 adjacent electrical box 150. Tension reel 156 continuously exerts a tension force on tension wire 154 which in turn exerts a rearward force on slidable sheaves 152 and 146. The force of the tension on slidable sheaves 146 and 152 is such that the slidable sheaves are pulled rearwardly when excess cable 142 is generated by the rearward sliding of carriage assembly 30 on extendable conveyor unit 24d (FIG. 17B). The tension created by tension reel 156, however, is small enough so that sheaves 146 and 152 are pulled forwardly when carriage assembly 30 is moved forwardly with respect to extendable conveyor unit 24d and extra cable length is required (FIG. 17A). Cable retracting unit 151 thus simply and effectively eliminates slack in cable 142, regardless of where carriage assembly 30 is positioned on extendable conveyor unit 24d.

Referring now to FIGS. 21–26, a conveyor 220 is extendable into a truck trailer 22 or the like and includes a plurality of extendable units 223, such as three extendable units 224a, 224b, and 224c, which extend forwardly from a base unit 226 or other type of support structure. The rearward or inner extendable units 224a, 224b of extendable conveyor 220 are substantially similar to those of extendable conveyor 20 discussed above, such that a detailed description will not be repeated here. A user interface section 221 is pivotally mounted at a forward most extendable unit 224c of extendable conveyor 220. User interface section 221 comprises a support section 230 and a boom section 232. Support section 230 is insertable within a forward end of extendable unit 224c and is horizontally pivotable about a generally vertical axis 288a at extendable unit 224c. Boom section 232 is mounted at a forward end of support section 230 and preferably is pivotable about a generally horizontal axis 238, such that boom section 232 is vertically adjustable with respect to support section 230 and extendable unit 224c. As shown in FIG. 23, boom section 232 may be pivoted upwardly approximately 90° from horizontal to a storage position when the extendable units 223 are fully retracted into base 226. Vertical adjustment of boom section 232 is accomplished by a height adjustment mechanism 245, which preferably includes an actuator 240, such as a linear actuator or the like, and a lift arm 242 extending from a lower and rearward portion of boom section 232.

Extendable units 223 define a conveying surface 228, which may comprise a conveyor belt, a plurality of rollers or the like, while boom section 232 defines a second conveying surface 241, which may also comprise a conveyor belt, rollers or the like. A sliding transition plate 251 is preferably provided at the forward end of forward extendable unit 224c to bridge the gap between conveying surfaces 228 and 241 and provide a smooth transition for packages to travel from one conveying surface to the next.

Forward extendable unit 224c is substantially similar to the extendable unit 24d discussed above, except that extendable unit 224c provides an opening in a forward-most end 225a (FIGS. 24–26) and a cavity or recess is defined within extendable unit 224c for pivotally mounting support section 230 of user interface section 221 within extendable unit 224c, as discussed below. A pivot mount 288, such as a spherical gimbal bearing mount or the like, is positioned forwardly of the forward end 225a of extendable unit 224c and provides a pivotable mounting structure for pivotally mounting support section 230 of user interface section 221 thereto. Additionally, an arcuate track 233 is provided along a lower surface 225b of forward unit 224c and within the cavity defined by the extendable unit 224c. Preferably, arcuate track 233 is arced or curved rearward of forward end 225a and is curved about pivot mount 288. Preferably, track 233 is a generally C-shaped track section, which allows at least one wheel or roller 239 to roll along track 233 and within the C-shaped channel defined thereby, as discussed below.

Support section 230 of user interface section 221 is positioned at least partially within forward extendable unit 224c and comprises a pair of sides 230a connected by a rear cross member 230b and a forward cross member 230c. A pivot mounting bracket 235 extends forwardly from front cross member 230c and engages pivot mount 288 at forward end 225a of extendable unit 224c. An actuator mounting bracket 237 extends forwardly from rear cross member 230b for pivotally securing an end of an actuator or linear motor 240 at support section 230. Preferably, one or more wheels or rollers 239, or other means for providing smooth transition along a track or plate within extendable unit 224c, are rotatably mounted to a wheel mounting bracket extending downwardly from opposite sides of rear cross member 230b. The rollers 239 are operable to rotatably engage arcuate track 233 to allow a rearward end of support section 230 to pivot about vertical pivot axis 288a while providing cantilever support of support section 230. The rolling engagement between rollers 239 and an upper wall of track 233 provides cantilevered support of user interface section 221 when it is partially positioned within the forward end portion of extendable unit 224c.

Preferably, as shown in FIG. 24, support section 230 is substantially narrower than the width of the forward-most extendable unit 224c to allow pivoting of support section 230 within extendable unit 224c. Preferably, support section 230 widens at a forward-most end 230d and extends upwardly to define a pair of mounting brackets 230e, which pivotally receive corresponding arms or tabs 232a of boom section 232, as discussed below.

Boom section 232 is preferably a belt conveyor section which comprises a conveyor belt 241 which is reeved about a powered roller 236a, a pair of support/guide rollers 236b and a reversing roller 236c. However, boom section 232 may otherwise provide a roller conveyor surface which comprises a plurality of rollers positioned along the boom section, without affecting the scope of the present invention. One or more control panels 247 may be provided at one or both sides near or at the forward end of boom section 232, to allow a user to adjust the extendable conveyor and/or the user interface section from the forward end of the user interface section. Preferably, boom section 232 further includes a package stop tray 243 at a forward end of boom section 232, which provides a flat surface for a package to rest at after it has been transferred forwardly along belt 241. Preferably, one or more sensors 246, such as photo-eyes or the like, are provided toward a rearward end of the package stop tray 243, to detect the presence of a package at the package stop tray 243. If a package is detected at the tray for a prolonged period of time, boom section 232 is operable to deactivate the powered roller 236a to stop conveyor belt 241, and thus prevent additional packages from moving forwardly onto the package stop tray until the detected package has been removed therefrom.

At a rearward end of boom section 232, a pair of mounting arms 232a extend rearwardly from an upper portion of boom section 232. Mounting arms 232a include an opening or aperture therethrough for receiving a mounting or pivot pin or the like to retain mounting arms 232a to the mounting arms 230e of support section 230, thereby pivotally securing boom section 232 to support section 230. The height of the pivot axis or pin 238 is such that conveying surface 228, conveying surface 241, and sliding transition plate 251 positioned therebetween, provide a generally continuous and planar surface when boom section 232 is pivoted such that the conveying surfaces are aligned, as shown in FIG. 25. A lift arm 242 extends downwardly and rearwardly from a rearward end of boom section 232 for attachment to actuator 240 at support section 230.

When assembled, support section 230 is positioned within the cavity defined by the side walls and lower and upper surfaces of forward-most extendable unit 224c. Rollers 239 extend rearwardly into the C-shaped channel defined by arcuate track 233 and rollingly engage an upper surface of the track to cantileverly support the support section within extendable unit 224c. Pivot mount bracket 235 pivotally secures support section 230 at the bearing mount 288 at the forward end 225a of lower surface 225b of extendable conveyor 224c. Accordingly, as shown in FIG. 24, support section 230 may pivot about vertical pivot axis 288a, while rollers 239 roll along arcuate track section 233 within extendable conveyor unit 224c. Although shown and described as the rollers on support section 230 engaging a track along a lower surface of the extendable conveyor unit, the present invention may have rollers or other movable means, such as sliding shoes or plates, which engage a track or plate positioned at the lower surface or elsewhere within the conveyor unit or even positioned below the conveyor unit, without affecting the scope of the present invention. It is envisioned that any other means for movably or slidably engaging a track, plate or the like may be implemented at the support section to allow horizontal adjustment of the support section relative to the extendable conveyor while also providing cantilevered support of the user interface section.

Mounting arms 232a are received within the mounting brackets 230e of support section 230 and pivotally retained therein, such that boom section 232 is vertically adjustable about horizontal pivot axis 238 relative to support section 230 and the extendable conveyor units 223, while boom section 232 is also horizontally pivotable along with support section 230 about vertical pivot axis 288a. Sliding transition plate 251 is provided between conveying surface 228 and conveying surface 241 to bridge the gap therebetween and provide smooth transition of packages between the conveying surfaces. The plate may be secured at a forward end of extendable conveyor section 224c and/or support section 230 such that sliding plate 251 maintains the transition surface when the boom section is raised and/or lowered.

Boom section 232 is pivotable about horizontal axis 238, and thus vertically adjustable with respect to the conveyor, via height adjustment mechanism 245, which preferably includes actuator or linear motor 240 and lift arm 242. Actuator 240 is pivotally mounted at one end to bracket 237 extending forwardly from rear cross member 230b and pivotally mounted at the other end to a lower and/or rearward end of lift arm 242 of boom section 232. As shown in FIG. 26, actuator 240 is operable to extend and retract to move the lower end of lift arm 242 forwardly and rearwardly with respect to support section 230. Extension of actuator 240 results in forward movement of the rearward end of the lift arm 242, which further results in raising of boom section 232 about horizontal pivot axis 238 relative to support section 230 and extendable conveyor unit 224c. Similarly, retraction of actuator 240 causes generally rearward movement of the lower end of lift arm 242, which results in lowering of boom section 232 about the horizontal pivot axis 238. As seen in FIG. 26, actuator 240 remains in a generally horizontal position, and thus extends and retracts in a generally forwardly and/or rearwardly direction, throughout the full range of motion of the boom section 232. Accordingly, the actuator 240 remains generally within a side profile defined by sides 230a of support section 230 and within the extendable conveyor unit 224c throughout the full range of motion of the boom section.

Therefore, user interface section 221 is operable to raise or lower a conveyor or boom section a substantial amount with respect to the extendable conveyor units. Preferably, as shown in FIG. 26, the boom section may be raised to approximately 90° above a generally horizontal orientation and may be lowered greater than approximately 15° below the horizontal orientation with respect to the conveyor units. By allowing the boom section to raise to a generally vertical position, the conveyor may be fully retracted to a storage position (FIG. 23) and the boom section may be raised upwardly to minimize interference with the floor space of the loading or unloading dock or warehouse when the conveyor is not in use. Additionally, the user interface section may be pivoted from side to side with respect to the extendable conveyor sections to ease the loading and/or unloading of packages within a truck trailer or the like. The user interface section may be manually pivoted about a vertical axis by a user or worker at the user interface section. Because the support section and actuator of the user interface section 221 are positioned entirely within an outer or forward extendable conveyor unit, the user interface section takes up a minimal amount of space outside of the extendable conveyor and does not extend down from a lower surface of the extendable conveyor unit. This allows the extendable conveyor to be fully retracted into its nested position at the base unit 226.

While the invention has been depicted in the attached drawings in the embodiment of an extendable unloading conveyor, it will be understood by those skilled in the art that the present invention finds equal applicability to extendable loading conveyors. Other modifications may also be made within the scope of the present invention including, for example, the substitution of rollers for either or both the conveyor belt and the boom belt.

Additional changes and modifications in the specifically described embodiments can be carried out without departing from the principles of the invention, which is intended to be limited only by the scope of the appended claims, as interpreted according to the principles of patent law including the Doctrine of Equivalents.

The embodiments of the invention in which an exclusive property or privilege is claimed are defined as follows:

1. An extendable conveyor, comprising:
  an extendable conveyor section supported in a cantilevered manner including at least one extendable conveyor unit that is extendable between an extended position and a retracted position nested within said extendable conveyor section;
  a user interface section supported in a cantilevered manner from said at least one extendable conveyor unit, wherein said user interface section is vertically adjustable about a substantially horizontal axis and horizontally adjustable about a substantially vertical axis;
  a conveying surface having a first portion defined on said extendable conveyor section and a second portion defined on said user interface section; and
  an actuator which is operable to vertically adjust said user interface section, said actuator being actuatable in a substantially horizontal direction throughout a full range of vertical adjustment of said user interface section.

2. The extendable conveyor of claim 1, wherein said full range of vertical adjustment is up to at least approximately 60 degrees above a generally horizontal orientation.

3. The extendable conveyor of claim 1, wherein said actuator comprises a linear actuator.

4. The extendable conveyor of claim 1, wherein said actuator comprises an electric motor.

5. The extendable conveyor of claim 1, wherein said first conveying surface portion comprises a conveyor belt and said second conveying surface portion comprises a conveyor belt.

6. The extendable conveyor of claim 5, wherein said first and second conveying surface portions comprise separate conveyor belts.

7. The extendable conveyor of claim 1, wherein said first conveying surface portion comprises rollers.

8. The extendable conveyor of claim 7, wherein said second conveying surface portion comprises a conveyor belt.

9. The extendable conveyor of claim 1 including an operator control panel on said user interface section that operates said actuator.

10. The extendable conveyor of claim 1, wherein said extendable conveyor section includes a base unit, wherein said at least one extendable conveyor unit nests in said base unit in a retracted position.

11. The extendable conveyor of claim 10, wherein said user interface section is vertically adjustable to a generally vertical orientation to provide a storage position of said user interface section.

12. The extendable conveyor of claim 1, wherein said at least one extendable conveyor unit comprises a plurality of said extendable conveyor units which nest into each other in retracted positions.

13. The extendable conveyor of claim 12, wherein said extendable conveyor section includes a base unit, wherein said plurality of extendable conveyor units nest in said base unit in retracted positions.

14. The extendable conveyor of claim 13, wherein said user interface section is supported from an outermost one of said plurality of extendable conveyor units.

15. The extendable conveyor of claim 1, wherein said user interface section comprises a boom section and a support section, said boom section defining said second portion of said conveying surface, said boom section being vertically adjustable relative to said support section and said at least one extendable unit.

16. The extendable conveyor of claim 15, wherein said support section defines a side profile thereof, said actuator being positioned within said side profile of said support section throughout the full range of vertical adjustment of said boom section.

17. The extendable conveyor of claim 16, wherein said support section is positioned at an upper surface of said at least one extendable conveyor unit.

18. The extendable conveyor of claim 16, wherein said support section is pivotally positioned at least partially within said at least one extendable conveyor unit.

19. The extendable conveyor of claim 15, wherein said support section is cantileverly supported at said extendable conveyor unit and is horizontally adjustable relative thereto, said boom section being cantileverly supported at said support section and being vertically adjustable relative thereto.

20. The extendable conveyor of claim 19, wherein said support section of said user interface section includes an outer end and an inner end, said outer end of said support section being pivotally mounted to said at least one extendable conveyor unit while said inner end is pivotable about the vertical axis within said at least one extendable conveyor unit, said boom section being pivotally mounted at said outer end and pivotable about the horizontal axis relative to said support section.

21. The extendable conveyor of claim 20, wherein said inner end of said support section provides movable cantilevered support for said user interface section via engagement with an arcuate track within said at least one extendable conveyor unit.

22. The extendable conveyor of claim 21, wherein said support section includes at least one roller at said inner end which provides rolling engagement along said arcuate track within said at least one extendable conveyor unit.

23. The extendable conveyor of claim 21, wherein said support section has a first width and said boom section has a second width, said second width being greater than said first width.

24. The extendable conveyor of claim 21, wherein said at least one extendable conveyor unit has an outer end, said support section being pivotally mounted to said at least one extendable conveyor unit at said outer end of said at least one extendable conveyor unit.

25. The extendable conveyor of claim 15, wherein said actuator is pivotally mounted to said boom section at a lift arm extending from said boom section such that extension and retraction of said actuator moves said lift arm to vertically adjust said boom section.

26. The extendable conveyor of claim 1, wherein said conveying surface comprises a trailer loading conveying surface.

27. The extendable conveyor of claim 1, wherein said conveying surface comprises a trailer unloading conveying surface.

28. An extendable conveyor for conveying articles between a particular location and a selectable variable location, comprising:

a support structure;
   a mechanically extendable section which is extendable along a longitudinal axis between a fully retracted position and a fully extended position, said mechanically extendable section supported in a cantilever fashion by said support structure, said mechanically extendable section having a conveying surface; and
   a user interface section which is horizontally adjustable with respect to said longitudinal axis of said extendable section, said user interface section having a conveying portion and a support portion, said support portion being at least partially positioned within said mechanically extendable section and pivotable about a substantially vertical axis with respect thereto, said conveying portion being supported in a cantilever fashion at said support portion and being pivotable about the vertical axis with said support section.

29. The extendable conveyor of claim 28, wherein said conveying portion of said user interface section is pivotally mounted at said support portion and is vertically adjustable with respect thereto via pivotal movement about a substantially horizontal axis.

30. The extendable conveyor of claim 28, wherein said support portion of said user interface section includes an outer end and an inner end, said conveying portion being mounted at said outer end, said outer end of said support portion being pivotally mounted to said mechanically extendable section while said inner end is pivotable within said mechanically extendable section.

31. The extendable conveyor of claim 30, wherein said inner end of said support portion provides movable cantilevered support via engagement with a track member within said mechanically extendable section.

32. The extendable conveyor of claim 31, wherein said support portion includes at least one roller at said inner end which rollingly engages said arcuate track within said mechanically extendable section, said at least one roller providing cantilevered support for said user interface section at said arcuate track.

33. The extendable conveyor of claim 30, wherein said support portion has a first width and said conveying portion has a second width, said second width being greater than said first width.

34. The extendable conveyor of claim 30, wherein said mechanically extendable section has an outer end, said support portion being pivotally mounted to said mechanically extendable section at said outer end of said mechanically extendable section and pivotable about the vertical axis relative to said mechanically extendable section.

35. The extendable conveyor of claim 30, wherein said conveying portion is pivotally mounted at said outer end of said support portion and is vertically adjustable about a substantially horizontal axis with respect to said support portion and said mechanically extendable section.

36. The extendable conveyor of claim 35, wherein said support portion further includes an actuator for vertically adjusting said conveying portion relative to said support portion.

37. The extendable conveyor of claim 36, wherein said actuator is pivotally mounted to said conveying portion at a lift arm extending from said conveying portion such that extension and retraction of said actuator moves said lift arm to vertically adjust said conveying portion.

38. The extendable conveyor of claim 36, wherein said actuator is actuatable in a generally horizontal direction throughout a full range of vertical adjustment of said conveying portion.

39. The extendable conveyor of claim 38, wherein said full range of vertical adjustment is greater than at least approximately 60 degrees above a generally horizontal orientation.

40. The extendable conveyor of claim 28, wherein said second conveying surface is an endless belt reeved on a set of belt rollers.

41. The extendable conveyor of claim 40 further including a motorized belt roller for powering said endless belt.

42. An extendable conveyor, comprising:

an extendable conveyor section supported in a cantilevered manner including at least one extendable conveyor unit that is extendable between an extended position and a retracted position nested within said extendable conveyor section;

a user interface section which includes a support section and a boom section, said boom section being supported in a cantilevered manner from said support section, said support section being movably engagable with an arcuate track at said extendable conveyor section and pivotally mounted toward an outer end of said extendable conveyor section such that said support section is pivotable about a vertical pivot axis and movably engages said arcuate track to provide cantilevered support of said support section while said support section is pivoting; and a conveying surface having a first portion defined on said extendable conveyor section and a second portion defined on said user interface section.

43. The extendable conveyor in claim 42, wherein said boom section is vertically adjustable about a generally horizontal axis at said support section.

44. The extendable conveyor in claim 43 further including an actuator which is operable to vertically adjust said boom section of user interface section, said actuator being operable in a generally horizontal orientation throughout a full range of vertical adjustment of said boom section.

45. The extendable conveyor in claim 44, wherein said actuator comprises a linear actuator.

46. The extendable conveyor in claim 44, wherein said actuator comprises an electric motor.

47. The extendable conveyor in claim 42, wherein said support section is movably engagable with said arcuate track via at least one roller member at said support section which rollingly engages said arcuate track.

48. The extendable conveyor in claim 47, wherein said at least one roller member rollingly engages an upper portion of said arcuate track to cantileverly support said support section relative to said at least one extendable conveyor unit.

49. The extendable conveyor in claim 42, wherein said first conveying surface portion comprises a conveyor belt and said second conveying surface portion comprises a conveyor belt.

50. The extendable conveyor in claim 42 including an operator control panel on said user interface section that operates said actuator.

51. The extendable conveyor in claim 42, wherein said extendable conveyor section includes a base unit, wherein said at least one extendable conveyor unit nests in said base unit in a retracted position.

52. The extendable conveyor in claim 51, wherein said boom section is vertically adjustable to a generally vertical orientation to provide a storage position of said user interface section.

53. The extendable conveyor in claim 52 further including a linear actuator for vertically adjusting said boom section, said linear actuator being actuatable in a substantially horizontal direction throughout a full range of vertical adjustment of said boom section.

54. The extendable conveyor in claim 42, wherein said at least one extendable conveyor unit comprises a plurality of said extendable conveyor units which nest into each other in retracted positions.

55. The extendable conveyor in claim 54, wherein said extendable conveyor section includes a base unit, wherein said plurality of extendable conveyor units nest in said base unit in retracted positions.

56. The extendable conveyor in claim 54, wherein said user interface section is supported at an outermost one of said plurality of extendable conveyor units.

57. The extendable conveyor in claim 42, wherein said conveying surface is a trailer loading conveying surface.

58. The extendable conveyor in claim 42, wherein said conveying surface is a trailer unloading conveying surface.

* * * * *